United States Patent
Siegel

(10) Patent No.: US 7,610,382 B1
(45) Date of Patent: Oct. 27, 2009

(54) SYSTEM AND METHOD FOR MARKING CONTENT

(75) Inventor: Hilliard Bruce Siegel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 546 days.

(21) Appl. No.: 11/479,825

(22) Filed: Jun. 30, 2006

(51) Int. Cl.
*G06F 17/27* (2006.01)

(52) U.S. Cl. .............. 709/226; 704/9; 704/10; 707/3

(58) Field of Classification Search ........ 709/226; 704/9, 257
See application file for complete search history.

(56) References Cited

U.S. PATENT DOCUMENTS

| | | | |
|---|---|---|---|
| 5,418,948 A * | 5/1995 | Turtle | 707/4 |
| 5,629,980 A | 5/1997 | Stefik et al. | |
| 5,634,012 A | 5/1997 | Stefik et al. | |
| 6,233,684 B1 | 5/2001 | Stefik et al. | |
| 6,912,294 B2 | 6/2005 | Wang et al. | |
| 7,031,471 B2 | 4/2006 | Stefik et al. | |
| 7,167,825 B1 | 1/2007 | Potter | |
| 7,171,016 B1 | 1/2007 | Rhoads | |
| 7,227,996 B2 | 6/2007 | Imagawa et al. | |
| 7,475,063 B2 * | 1/2009 | Datta et al. | 707/3 |
| 2002/0010639 A1 * | 1/2002 | Howey et al. | 705/26 |
| 2004/0034630 A1 * | 2/2004 | Volcani et al. | 707/3 |
| 2005/0283473 A1 * | 12/2005 | Rousso et al. | 707/5 |
| 2006/0031207 A1 * | 2/2006 | Bjarnestam et al. | 707/3 |
| 2006/0112131 A1 * | 5/2006 | Harrold et al. | 707/102 |
| 2006/0136466 A1 * | 6/2006 | Weiner et al. | 707/102 |
| 2007/0073678 A1 * | 3/2007 | Scott et al. | 707/5 |
| 2007/0244693 A1 * | 10/2007 | Atallah et al. | 704/9 |
| 2008/0059153 A1 * | 3/2008 | Bennett | 704/9 |
| 2009/0144248 A1 * | 6/2009 | Treadgold et al. | 707/3 |

OTHER PUBLICATIONS

Kocher, et al., "Self-Protecting Digital Content," A Technical Report from the CRI Content Security Research Initiative, Copyright 2002-2003, pp. 1-14.

Dennis Fisher, "Securing Digital Content," eweek.com article, http://www.eweek.com/article2/0, 1759, 1660148,00.asp, Apr. 21, 2003, pp. 1-5.

(Continued)

*Primary Examiner*—Krisna Lim
(74) *Attorney, Agent, or Firm*—Robert C. Kowert; Meyertons, Hood, Kivlin, Kowert & Goetzel, P.C.

(57) ABSTRACT

Method and apparatus for programmatically substituting synonyms into distributed text content. A synonym substitution mechanism may programmatically replace selected words in textual data with synonyms for the selected words. The modification to an excerpt performed by the synonym substitution mechanism may not significantly alter the meaning of the excerpt to a human reader. By replacing one or more selected words in an excerpt with synonyms for the words, illicit copies of the excerpt may be recognized by comparing a copy of the excerpt to the original. Particular permutations of synonym substitutions may be provided in excerpts to particular requestors. The particular permutations may be recorded and used to determine a requestor as the source of a copy of the excerpt. Synonym substitution may make programmatic excerpt chaining difficult by substituting different synonyms for the same word(s) in an overlapping portion of two adjacent excerpts.

46 Claims, 9 Drawing Sheets

OTHER PUBLICATIONS

"Microsoft DRM Technologies Establish Foundation for Emerging Internet Music, Video and eBooks Industries," http://www.microsoft.com/presspass/press/2002/jun01/03-13DRMPR.asp, Jun. 13, 2001, pp. 1-3.

SDKs and Versions of Windows Media DRM, http://www.microsoft.com/windows/windowsmedia/forpros/drm/sdksandversion.asp, pp. 1-4.

Microsoft Coporation, "Architecture of Windows Media Rights Manager," http://www.microsoft.com/windows/windowsmedia/howto/articles/drmarchitecture.asp, May 2004, pp. 1-4.

Andrea Pruneda, "Using Windows Media Encoder to Protect Content," Microsoft Corporation, http://www.microsoft.com/windows/windowsmedia/hotwo/articles/ProtectContent.asp, Mar. 2003, pp. 1-5.

XrML—The Digital Rights Language for Trusted Content and Services, http://www.xrml.com/about.asp, Copyright 2002-2005, pp. 1-2.

XrML—Frequently Asked Questions (FAQ), http://www.xrml.org/faq.asp, Copyright 2002-2005, pp. 1-4.

Faultline, "CE giants Open DRM to the Community," http://www.theregister.co.uk/2005/01/24/community_source_program/, Jan. 24, 2005, pp. 1-4.

Erikson, et al., "Principals for Standardization and Interoperability in Web-Based Digital Rights Management," http://www.w3.org/2000/12/drm-ws/pp/hp-erikson.html, Jan. 2001, pp. 1-6.

Hallam-Baker, et al., "WS-Security Profile for XML-Based Tokens," http://www.ibm.com/developerworks/library/ws-sectoken.html, Aug. 28, 2002, pp. 1-9.

U.S. Appl. No. 11/096,223, filed Mar. 31, 2005.

* cited by examiner

| Client 224 identifier | Data copy 250 identifier | Permutation identifier | Other information |
|---|---|---|---|
| Client A identifier | Data copy A identifier | Permutation identifier A | Information A |
| Client B identifier | Data copy B identifier | Permutation identifier B | Information B |
| ... | ... | ... | ... |

Data copy information 254

*Figure 3* film/movie, flick
excellent/outstanding, great, fantastic, wonderful...
fun/enjoyable, delightful, ....
movie/film, flick
whole/entire, complete, total ...
...

*Figure 4*

This film is an excellent example of a fun movie that is viewable by the whole family.

*Figure 5A*

This movie is a great example of a delightful film that is viewable by the whole family.

*Figure 5B*

This movie is an outstanding example of an enjoyable flick that is viewable by the entire family.

SYSTEM AND METHOD FOR MARKING CONTENT

BACKGROUND OF THE INVENTION

1. Field of the Invention

This invention relates to computer networks, and, more particularly, to marking copies of content distributed on a network.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the Web." The Web may be defined as all the resources (e.g., Web pages and Web sites) and users on the Internet that use the Hypertext Transfer Protocol (HTTP) or variations thereof to access the resources. A Web site is a related collection of Web files that includes a beginning file called a home page. From the home page, the user may navigate to other Web pages on the Web site. A Web server program is a program that, using the client/server model and HTTP, serves the files that form the Web pages of a Web site to the Web users, whose computers contain HTTP client programs (e.g., Web browsers) that forward requests and display responses. A Web server program may host one or more Web sites.

Web Services

As described above, the conventional Web model allows users to access Web resources (e.g., applications, services, and data) via an HTTP client program, such as a Web browser. A technology referred to as Web services has been developed to provide programmatic access to Web resources. Web services may be used to provide Web software developers programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

FIG. 1 is a block diagram that illustrates an exemplary system configuration that provides a Web service interface, and shows the interaction between a Web service client and a Web service provider. In this example, a Web service interface 106 may be implemented on a server 130 coupled to Internet 100. This server 130 may be referred to as a "Web service provider." Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a "Web browser" interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120. Further, note that Web service client 124 may itself be another Web service.

To access an application, service or data provided by the Web service provider 130, Web service client 124 may send a request message to Web service interface 106 via Internet 100. This request message goes through the network and Internet infrastructures; through the Web service client 124's local network routers, switches, firewalls, etc., through the Internet backbone, to the Web service provider's local network, to server 130, and then to Web service interface 106. Web service provider 130 may then process the request, for example by performing an indicated function(s) of application or service 108 or accessing indicated data in database 142. Web service interface 106 may then return results of the processing to the Web service client 124 in a response message via Internet 100, back through the local networks and Internet backbone.

Web services may be used in a variety of applications. One example of an area in which Web services may be used is for product merchandising. A first enterprise may provide a Web site or Web application hosted on one or more Web servers that may access information from a second enterprise's Web server or Web servers through Web services provided by the second enterprise's Web server(s), such as product catalog information, to merchandise products from the product catalog through the first enterprise's Web site or Web application. The second enterprise may earn a commission from the first enterprise for each sale.

An enterprise may sublicense at least part of a collection of potentially copyrighted data owned by the enterprise, such as product information in a product catalog, to third party developers under some sort of licensing agreement. The third party developers may be given access to the data in a systematic fashion through a Web service interface, through which the third parties may request and receive copies of particular portions of the data collection. A third party developer may, in some cases, refurbish data received from the enterprise and/or sell it or redistribute it, possibly in violation of the licensing agreement.

Another example of an area in which Web services may be used is to provide excerpts from, or in some cases entire copies of, copyrighted textual works including, but not limited to, books, short stories, product reviews, book or movie reviews, news articles, editorial articles, technical papers, scholastic papers, and so on, to subscribed users of the Web service. An example is a Web service of an e-commerce Web site that sells books and that allows subscribed users to obtain and read excerpts from published or to-be-published books it offers for sale. A user may, in some cases, attempt to sell, redistribute or republish obtained excerpts, possibly in violation of the licensing agreement. Another potential problem is that a user may attempt to obtain enough excerpts from the work through the Web service to programmatically reconstruct the entire copyrighted work.

Data Protection Mechanisms

Various mechanisms for protecting copyrighted works and materials from unauthorized copying and/or for detecting illicit copies of copyrighted works have been implemented. Falsified content may be inserted into copyrighted material with the intent of deterring, and detecting, illicit or unauthorized copying of the material, both for works that are in print and electronic/digital works. For example, mapmakers may insert deliberately inaccurate or fictitious roads or place names in maps. Enterprises that provide phone directories may insert fictitious listings into the directories. The intent of this falsified content is to be perceivable but not easily recognizable as "false content" to the casual viewer, including those who might want to illicitly copy the material. The publisher of a work knows what content of the work is fictitious, but the copyright infringer does not. If some entity illicitly uses portions from this material that includes the falsified content, the illicit use may be detected by the inclusion of the falsified content. Conventionally, the same fictitious information is inserted into each published copy of a work.

"Watermarks" may be inserted into various works, both works that are in print and electronic/digital works. The intent of watermarks is generally to mark a work in such a way as to not interfere with the work itself, while providing a mechanism to help protect the work from being illicitly copied, or to at least to make it easier to detect illicit or unauthorized copies. Watermarks for printed works are generally invisible under normal conditions, and only visible under certain conditions, such as when a copy of the work is held up to a bright light. Digital watermarks are generally "invisible" and cannot be perceived by the casual viewer. As far as the casual viewer is concerned, the digital watermark is simply not there. This is in contrast with the inserted falsified content described above, which is readily perceivable by a person viewing the material including the falsified content, although the typical viewer does not recognize the content as fictitious. Conventionally, as is the case for the inserted falsified content described above, the same watermark is inserted into each published copy of a work.

Various works, both works that are in print and electronic/digital works, may be individually marked in such a way so that one particular copy of the work may be uniquely distinguished from another copy of the work. An example is the use of serial numbers on works, both "real" and electronic/digital works. Some mechanisms may "hide" this information so that it is not easily perceivable in the work.

SUMMARY

Various embodiments of a method and apparatus for programmatically substituting synonyms into text content distributed through a Web service are described. Embodiments may provide a synonym substitution mechanism that may programmatically replace selected words in textual content with synonyms for the selected words. In one embodiment, the synonym substitution mechanism may programmatically replace selected words with synonyms in excerpts of copyrighted textual works to be provided to clients via a Web service interface.

In one embodiment, the modification to an excerpt performed by the synonym substitution mechanism may not significantly alter the meaning of the excerpt to a human reader. In other words, the synonym substitution may be performed in such a way as to retain the original meaning of the excerpt. Thus, the synonym substitution in an excerpt may not be readily detectable to a casual reader that does not have access to or knowledge of the original. However, while the changes to an excerpt may be invisible or meaningless to a human, the changes may be profoundly confusing to a computer program.

In one embodiment, the synonym substitution mechanism may select synonyms for selected words in an excerpt from a synonym database. The synonyms for words in a synonym database may be at least partially determined, selected, and/or edited by humans to insure that the synonyms for a word are close matches in meaning and not ambiguous, potentially awkward or offensive, or otherwise inappropriate or potentially problematic. For each key word in the synonym database, the database may include one or more alternative synonyms. The synonym substitution mechanism may select a synonym for a word from among two or more candidate synonyms according to a random selection algorithm. Alternatively, some other algorithm may be used to select a synonym from among two or more candidate synonyms.

By replacing one or more selected words in an excerpt from a textual work with synonyms for the words, illicit copies of the excerpt may be recognized by comparing a copy of the excerpt to the original. In one embodiment, particular permutations of synonym substitutions may be provided in excerpts to particular clients. The particular permutation provided to a particular client may be recorded and used to determine a client as the source of an illicit copy of the excerpt. In addition, a Web search for phrases from an excerpt that include one or more synonym substitutions may be used to detect illicit copies of an excerpt that was provided to a particular client via the Web service.

As another example of a use for permutations of synonyms in copies of excerpts, a client may be allowed to locally cache a copy of an excerpt for a period. This period may be limited in accordance with an agreement with the Web service provider. Thus, a copy of an excerpt provided to the client expires after the period. As noted above, information on a particular permutation of an excerpt that includes a unique permutation of synonyms and that was provided to a particular client may be recorded along with a timestamp. This recorded information may be used to detect an expired copy of the excerpt.

Replacing one or more selected words in excerpts from a textual work with synonyms for the words may also be effective in preventing, or at least making difficult, programmatic "excerpt chaining." In excerpt chaining, starting and ending phrases of excerpts from a textual work are compared to reconstruct larger portions of the work. In one embodiment, synonym substitution may make programmatic excerpt chaining difficult if not impossible by substituting different synonyms for the same word(s) and/or by substituting synonyms for one or more different words in an overlapping portion of two adjacent excerpts.

BRIEF DESCRIPTION OF THE DRAWINGS

FIG. 3 illustrates exemplary data copy information that may be stored by synonym substitution mechanism according to one embodiment.

FIG. 4 illustrates a portion of an example of a synonym database according to one embodiment.

FIGS. 5A through 5C illustrate an "excerpt" and synonym substitution in the excerpt according to one embodiment.

FIGS. 6A through 6D illustrate two adjacent and overlapping excerpts and synonym substitution in the excerpts that may help prevent excerpt chaining according to one embodiment.

Figure 1:
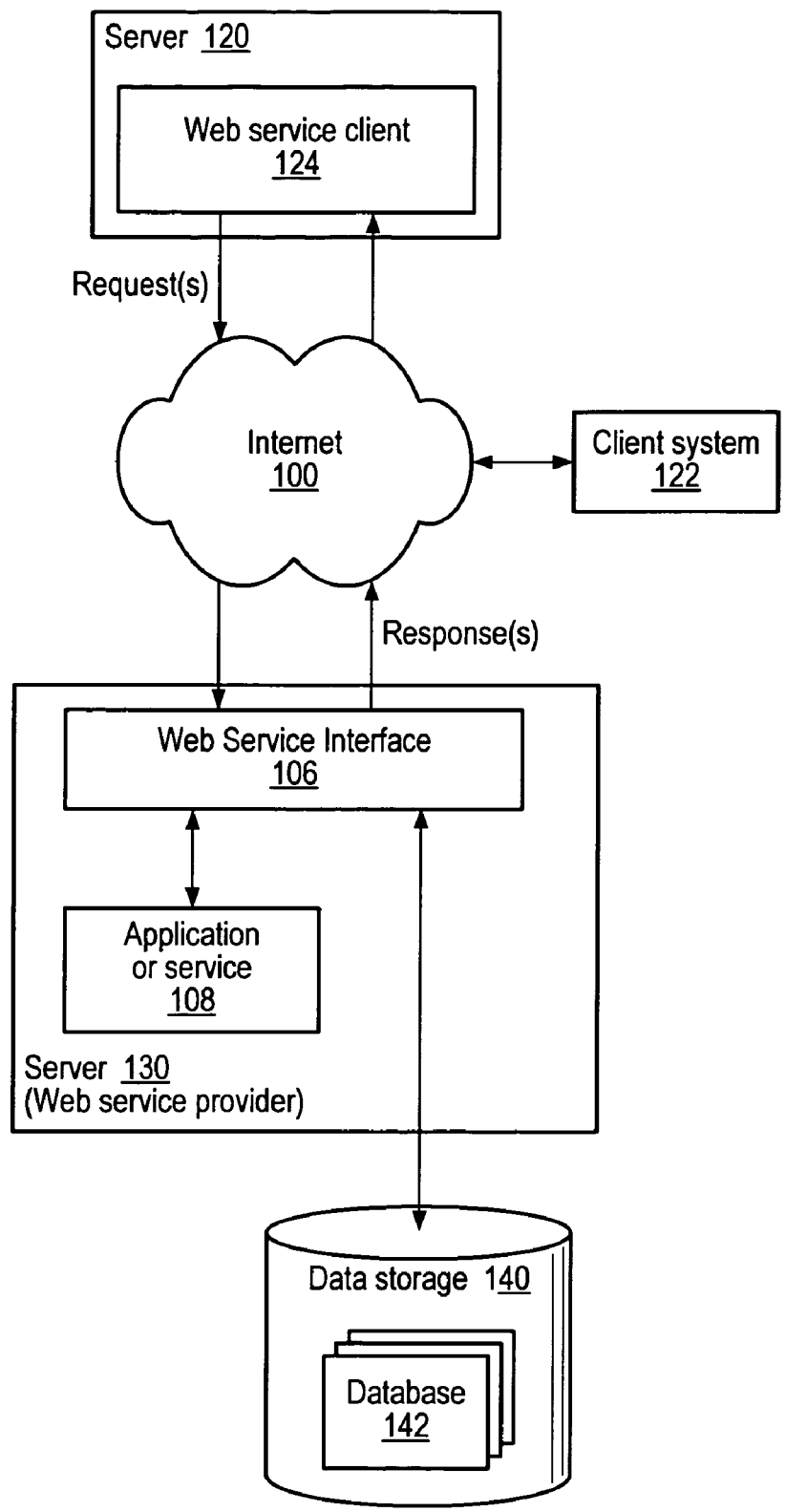
FIG. 1 is a block diagram that illustrates an exemplary system configuration that provides a Web service interface, and shows the interaction between a Web service client and Web service provider.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a method and apparatus for programmatically substituting synonyms into text content distributed through a Web service are described. Embodiments may provide a synonym substitution mechanism that may programmatically replace selected words in textual content with synonyms for the selected words. In one embodiment, the synonym substitution mechanism may programmatically replace selected words with synonyms in excerpts of copyrighted textual works to be provided to clients via a Web service interface. The synonym substitutions in an excerpt may, for example, help to reduce and/or detect illicit use of the excerpt.

In one embodiment, the modification to an excerpt performed by the synonym substitution mechanism may not significantly alter the meaning of the excerpt to a human reader. In other words, the synonym substitution may be performed in such a way as to retain the original meaning of the excerpt. Thus, the synonym substitution in an excerpt may not be readily detectable to a casual reader that does not have access to or knowledge of the original. Similarly, the synonym substitution in an excerpt will not be programmatically detectable without the original for comparison. However, while the changes to an excerpt may be invisible or meaningless to a human, the changes may be profoundly confusing to a computer program such as a program designed to chain excerpts from a copyrighted work together to form larger portions of the work by comparing first and last phrases or portions of the excerpt.

A site may provide a Web service interface whereby clients may obtain excerpts from, or in some cases entire copies of, copyrighted textual works including, but not limited to, books, short stories, product reviews, book or movie reviews, news articles, editorial articles, technical papers, scholastic papers, and so on, to the subscribed clients of the Web service. An example is a Web service of an e-commerce Web site that sells books and that allows subscribed clients to obtain and read excerpts from published or to-be-published books it offers for sale. Another example may be a Web site for a library that loans books to its registered clients. Embodiments of the synonym substitution mechanism may help to detect and/or prevent or discourage unauthorized or illicit use of excerpts of copyrighted textual material obtained via the Web service. For example, a client may attempt to sell, redistribute or republish obtained excerpts in violation of the licensing agreement. As another example, a client may attempt to obtain enough excerpts from a copyrighted work through the Web service to programmatically reconstruct the entire copyrighted work.

In one embodiment, the synonym substitution mechanism may select synonyms for selected words in an excerpt from a synonym database. The synonyms for words in a synonym database may be at least partially determined, selected, and/or edited by humans to insure that the synonyms for a word are close matches in meaning and not ambiguous, potentially awkward or offensive, or otherwise inappropriate or potentially problematic. For each key word in the synonym database, the database may include one or more alternative synonyms. In one embodiment, the synonym substitution mechanism may select a synonym for a word from among two or more candidate synonyms according to a random selection algorithm. Alternatively, some other algorithm may be used to select a synonym from among two or more candidate synonyms.

By replacing one or more selected words in an excerpt from a textual work with synonyms for the words, illicit copies of the excerpt may be recognized by comparing a copy of the excerpt to the original. In one embodiment, particular permutations of synonym substitutions may be provided in excerpts to particular clients. The particular permutation provided to a particular client may be recorded and used to determine the client as the source of an illicit copy of the excerpt. In addition, a Web search for phrases from an excerpt that include one or more synonym substitutions may be used to detect illicit copies of an excerpt that was provided to a particular client via the Web service. Permutations of synonym substitutions may take different forms. For example, in one embodiment, a set of selected words in an excerpt may each have two or more candidate synonyms. Copies of an excerpt provided to two or more clients may each include unique permutations of the candidate synonyms for the selected words. Alternatively, synonym substitution may be performed for different sets of words in copies of an excerpt provided to multiple clients. In another embodiment, a combination of the two permutation methods may be used. These unique permutations may be recorded along with information on the particular clients that the excerpts were provided to, allowing copies of the excerpt to be traced to the particular clients.

As another example of a use for permutations of synonyms in copies of excerpts, a client may be allowed to locally cache a copy of an excerpt for a period. This period may be limited in accordance with an agreement with the Web service provider. Thus, a copy of an excerpt provided to the client expires after the period. As noted above, information on a particular permutation of an excerpt that includes a unique permutation of synonyms, and that was provided to a particular client, may be recorded along with a timestamp. This recorded information may be used to detect an expired copy of the excerpt. For example, if it is detected that a particular client is providing a copy of an excerpt that includes a particular unique permutation of synonyms, the timestamp for when that client was provided that particular excerpt may be compared to the time when it was detected that the client was providing the copy of the particular excerpt. If the period of time since the client was provided that particular excerpt is greater than the allowed period, then the copy of the excerpt may be determined to have expired.

Replacing one or more selected words in excerpts from a textual work with synonyms for the words may also be effective in preventing, or at least making difficult, programmatic "excerpt chaining." A client may possibly use a Web service to obtain multiple excerpts from a copyrighted work. These excerpts potentially overlap, with adjacent excerpts from the original work including overlapping portions. Excerpt chaining may be programmatically performed to link the overlapping excerpts and to thus generate larger portions of the copyrighted work, possibly even the entire work. In excerpt chaining, starting and ending phrases of excerpts from a textual work are compared to reconstruct larger portions of the work. In one embodiment, synonym substitution may make programmatic excerpt chaining difficult if not impossible by substituting different synonyms for the same word(s) and/or by substituting synonyms for one or more different words in an overlapping portion of two adjacent excerpts.

Should an entity be successful in chaining two or more excerpts to generate a larger portion of the work, or even the entire work, from which the excerpts come, the presence of synonym substitutions in the chained excerpts may allow the illicit copy of the work to be identified and possibly even traced back to the client that originally obtained the excerpts via the Web services interface.

Note that excerpts may be located through a Web services interface by providing search terms to the interface. Embodiments of the synonym substitution mechanism may programmatically occasionally substitute close and unambiguous synonyms for words in an excerpt that are not used in the search terms used to locate the excerpt. In this way, the integrity of the original search is preserved, yet if a search is re-initiated using a portion of the remainder of the excerpt, no results may be found. In one embodiment, a substitution algorithm that hashes the excerpts and uses the hash to decide which words in an excerpt are eligible for synonym substitution may be used. Alternative substitution algorithms are possible and contemplated.

In one embodiment, words that are close and unambiguous as synonyms for particular words may be used, and synonym substitution may be applied sparingly to only a limited number of words in an excerpt. For example, substituting synonyms for only one to three words per page may be enough to render excerpt chaining useless or nearly so.

In one embodiment, synonym substitution may be "turned off" for particular copyrighted works, for example via an administrative tool, for example if an author or other interested party objects to synonym substitution in a particular work. As another example, synonym substitution may not be useful or necessary for certain types of textual works, or may alter the works in undesirable ways, such as classical literature, poetry, legal documents, and song lyrics, and thus synonym substitution may not be applied to certain textual works for which excerpts may be provided.

One embodiment of the synonym substitution mechanism may include an automated detection mechanism that searches the Web for instances of data copies (e.g., excerpts from copyrighted works) with substituted synonyms that have been illicitly copied, for example to Web sites that are not covered by the terms and conditions for use of the material according to the agreement or contract between the Web service provider and the Web service clients that originally obtained the data copies. In one embodiment, the detection mechanism may perform a search of the Web using some third-party search engine for a particular phrase or phrases that include one or more substituted synonyms to generate a pool of candidate Web pages that may include the data copy with substituted synonyms. The detection mechanism may then further examine these candidate Web pages to determine which ones actually include the data copy with substituted synonyms. Once this subset of candidate Web pages is determined, the subset may be further examined to determine which of the Web pages, if any, include illicit or unauthorized instances of the data copy. In one embodiment, particular permutations of synonym substitutions may be unique to data copies provided to particular clients and thus linkable to the Web service client that originally obtained the copy. Information associating a particular data copy with a particular client may be recorded by the synonym substitution mechanism, and may be used to determine which of the Web sites include legitimate copies and which include illicit or unauthorized copies. Information on illicit/unauthorized copies may, for example, be presented to the Web service client and/or to the entity or enterprise that possesses an illicit or unauthorized copy of the data copy to enforce the terms of the agreement between the Web service provider and/or to persuade the entity or enterprise that is in possession of the illicit copy to delete the copy or enter into a usage agreement with the Web service provider. This information could conceivably be used as evidence of copyright infringement in a legal action, if necessary.

In one embodiment, the synonym substitution mechanism may be a Web service with a Web service interface that allows Web service clients to access the synonym substitution mechanism through the Web service interface to substitute synonyms into data copies, for example data copies extracted from third-party works or collections, and to access the detection mechanism of the synonym substitution mechanism to detect illicit or unauthorized instances of the data copies on the Web.

While embodiments of the synonym substitution mechanism are generally described herein as being used to substitute synonyms into data copies distributed via a Web service interface and possibly for tracking instances of those data copies on the Web, note that embodiments of the synonym substitution mechanism may be used with other mechanisms for distributing data than Web services. For example, embodiments of the synonym substitution mechanism may be used to substitute synonyms into data accessed on a Web site through a Web client interface by clients using Web browsers. A particular permutation of synonyms may be inserted into particular data accessed by a client using a Web browser, and illicit copies of the data detected on the Web that include the permutation may be traced back to the client, for example by associating a unique customer identifier provided to the client when the client registered with the Web site with the particular permutation of synonyms.

While embodiments of the synonym substitution mechanism are generally described as substituting synonyms for selected words in copies of excerpts from textual works, it is noted that other embodiments of a substitution mechanism may substitute content using other substitution criteria into copies of excerpts from textual works. For example, instead of or in addition to synonyms, one embodiment may substitute icons, images, symbols, foreign language equivalents, alternative spellings and/or misspellings for selected words. As another example, instead of or in addition to synonyms for words, other embodiments may substitute synonymous or equivalent phrases and/or sentences for selected phrases or sentences. As yet another example, instead of or in addition to synonyms for words, one embodiment may substitute alternative punctuations in selected places. In general, embodiments of a substitution mechanism similar to the synonym substitution mechanism are contemplated that operate substantially the same to substitute equivalent content of various types using various substitution criteria in excerpts from textual works.

Further, while embodiments of the synonym substitution mechanism are generally described as substituting synonyms for selected words in copies of excerpts from textual works, note that embodiments may be used to substitute synonyms for words in other types of works, for example in graphical works or digital images, and in data objects, documents, and files that may include a combination of two or more different types of content, such as Web pages.

While embodiments are generally described in reference to a Web service that provides a Web service interface to request and receive textual data with synonym substitution performed by the synonym substitution mechanism, embodiments of the synonym substitution mechanism may be implemented in conjunction with other architectures than a Web services architecture, for example in conjunction with a server-hosted application accessible by clients according to a client/server architecture, as a synonym substitution mechanism provided by one or more peer nodes in a peer-to-peer networking environment, or in general as one or more modules, services, and/or applications on a system accessible via an API to other modules, services or applications on the same system and/or on other systems coupled to the system via a network interface or some other communications interface.

Figure 2:
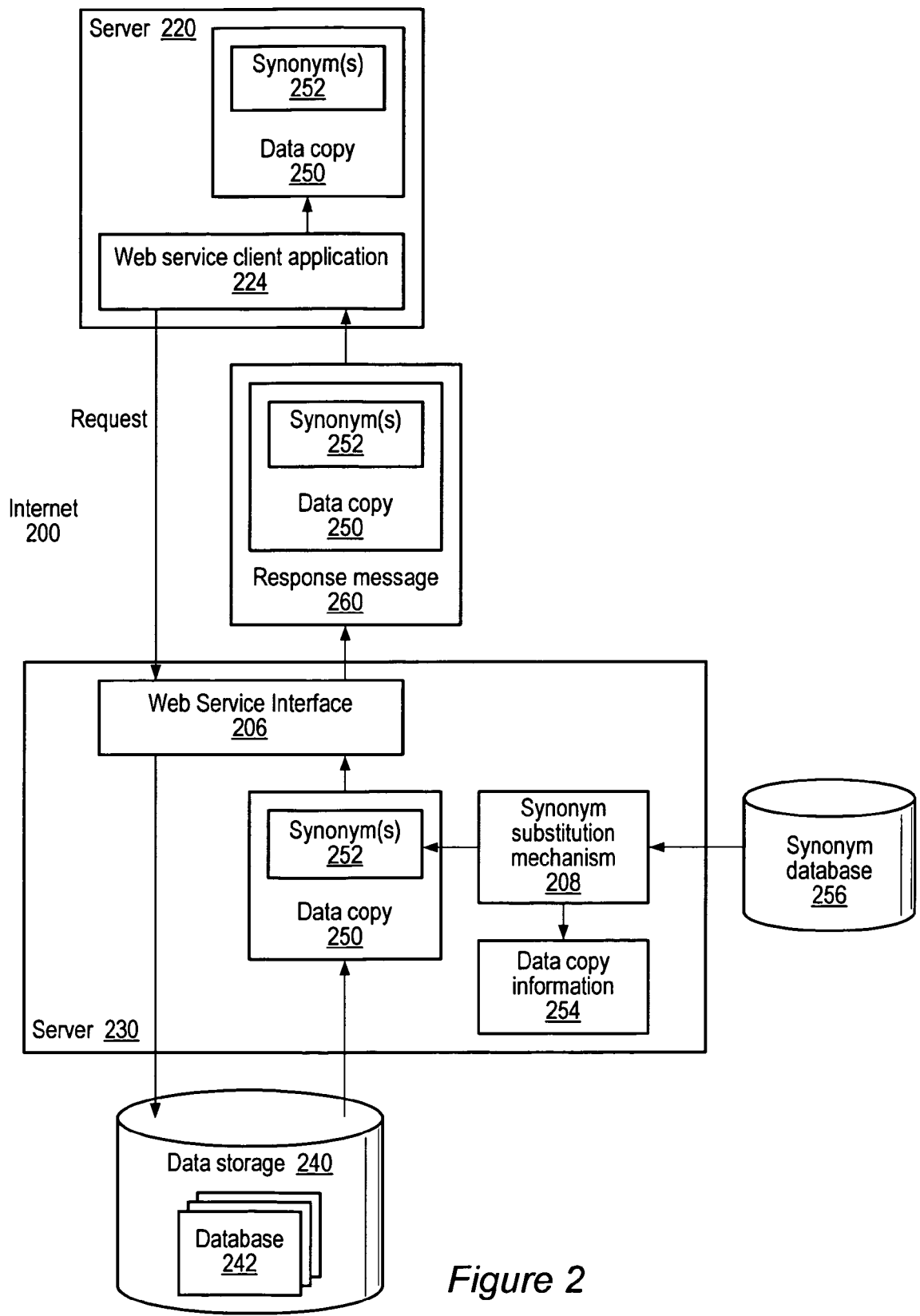
FIG. 2 illustrates an exemplary system configuration that provides a Web service interface, and shows the interaction between a Web service client application and a Web service provider that, for example, provides excerpts from textual works to Web service client applications with synonyms substituted for selected words according to one embodiment.

FIG. 2 illustrates an example of a system configuration that provides a Web service interface, and shows the interaction between a Web service client application and a Web service provider that, for example, provides excerpts from textual works to Web service client applications with synonyms substituted for selected words according to one embodiment. In this example, a Web service interface 206 may be implemented on a server 230 coupled to Internet 200. This server 230 may be referred to as the "Web service provider." Server 230 may be coupled to data storage 240 for storing information in database 242. Database 242 may include any type or types of data, including, but not limited to, textual data which may include digital copies of copyrighted textual works, graphical data (images), audio data, movie or video clips, or combinations thereof. As another example, database 242 may include data stored as Web pages for display on a Web site provided by the Web service provider. These Web pages may include, for example, item detail pages for products offered for sale by the Web service provider.

Server 220 may be coupled to Internet 200. Server 220 may host a Web service client application 224. Web service client application 224 may be configured to programmatically access database 242 via Web service interface 206. Note that the Web service interface does not provide a Web browser interface, but instead provides a programmatic interface via an API through which at least some content of database 242 may be programmatically accessed and copied by Web service client application 224 under a licensing agreement with the enterprise that owns the data in database 242. Server 220 may, for example, provide a Web site accessible to client(s) via Web browsers, and Web service client application 224 may be configured to access and copy at least some content of database 242 via Web service interface 206 to provide access to the copied content to the clients under a licensing agreement with the enterprise that owns the data in database 242. Note that the copied content may include, but is not limited to, excerpts from copyrighted textual works, such as books. Further note that the client may locally cache copied content on server 220 under terms of a licensing agreement with the Web service provider 230. In some cases, the length of time that copied content may be locally cached may be limited by the terms of the licensing agreement.

To access and copy particular data provided by the Web service provider 230, Web service client application 224 may send a request message to Web service interface 206 via Internet 200. Web service provider 230 may then process the request by accessing the indicated data in database 242. A copy of the requested data 250 may be generated. Synonym substitution mechanism 208 may then programmatically replace one or more selected words in data copy 250 with synonyms 252 from synonym database 256. In one embodiment, synonym substitution mechanism 208 may store information on the data copy 250 in data copy information 254. The information in data copy information 254 may associate the particular data copy 250 with the particular Web service client application 224 according to a particular permutation of synonyms for a particular selection of words used in the particular data copy 250. This information may later be used to identify instances of the particular data copy 250 and to link or trace the instances of data copy 250 to the Web service client application 224. Web service interface 206 may return the data copy 250 including one or more substituted synonyms 252 to the Web service client application 224 in a response message 260 via Internet 200. In some cases, the data copy 250 may be locally cached on server 220.

As previously mentioned, database 242 may include any type or types of data, including, but not limited to, textual, graphical, audio, and video data, or combinations thereof. Data copy 250 may be an excerpted copy of a portion of the data in the database 242 or an excerpted copy of a portion of the data from a subset of the database 242. Data copy 250 may be textual, graphical, video, or audio data, or a combination thereof. Data copy 250 may be, for example, an excerpted portion of a copyrighted textual work, such as a book, article, technical or scholarly paper or publication, short story, book or movie review, etc. As another example, data copy 250 may be all or a portion of a Web page, for example an item detail page for a product offered for sale by the Web service provider.

In one embodiment, the synonyms 252 substituted into a particular data copy 250 may be a permutation of sets of two or more synonyms for two or more selected words in the data copy (e.g., a particular excerpt from a copyrighted textual work). The permutation of synonyms may be generated from a template of selected words at particular locations in the particular data that is to be copied, and the synonyms may be selected from sets of two or more candidate synonyms for each of the selected words stored in synonym database 256. Thus, each permutation of synonyms generated for a data copy 250 may be similar, but not identical, to other permutations of synonyms 252 inserted into other copies of the same data provided to other Web service clients or to the same Web service client at different times.

As an example, synonyms may be substituted for particular words in a product review, with different combinations of synonyms 252 being used for each data copy 250 containing the product review provided to different Web service clients. As another example, synonyms may be substituted for particular words in excerpts from a copyrighted textual work such as a book, with different combinations or permutations of synonyms being used for each data copy 250 containing the excerpt provided to different Web service clients. Information on a particular data copy 250 that includes a unique permutation of synonyms 252 and that was provided to a particular client may be recorded as data copy information 254.

An example of a use for permutations of synonyms in data copies 250 is to discover and trace illicit copies of data copy 250 to particular clients using data copy information 254.

As another example of a use for permutations of synonyms in data copies 250, a client may be allowed to locally cache a data copy 250 for a period. This period may be limited in accordance with an agreement with the Web service provider. Thus, a data copy 250 provided to the client expires after the period. As noted above, information on a particular permutation of an excerpt that includes a unique permutation of synonyms and that was provided to a particular client may be recorded along with a timestamp as data copy information 254. This recorded information 254 may be used to detect an expired data copy 250.

As yet another example of a use for permutations of synonyms in data copies 250, if a Web service client obtains two adjacent excerpts from a copyrighted textual work, each of the adjacent excerpts may include overlapping portions with the other excerpt. In this case, different synonyms may be used for the same words in the overlapping portions of the two excerpts, which may help to prevent programmatic excerpt chaining.

In alternative embodiments, other mechanisms than synonym substitution may be used; for example, particular words may be deliberately misspelled, or alternative spellings or punctuations may be used. In some embodiments, combinations of mechanisms may be used; for example, two or more alternative synonyms may be used at one or more particular word positions and two or more alternative spellings may be used for other words in text to generate a unique permutation of data copy 250 that is traceable to a particular Web service client using the stored data copy information 254.

FIG. 3 illustrates exemplary data copy information 254 that may be stored by synonym substitution mechanism 208 according to one embodiment and is not intended to be limiting. For each copy of extracted data distributed to Web service clients, an entry may be made in data copy information 254. Each entry may include one or more of, but is not limited to, information uniquely identifying or that can be used to uniquely identify the particular Web service client (such as a unique customer identifier assigned to the Web service client), the particular excerpt of the content of database 242 (e.g., a particular Web page, product review, or portion of a copyrighted textual work) that was provided to the Web service client, and the particular permutation of synonyms 252 that was substituted into the data copy. Other relevant information, such as time stamps, may also be stored in data copy information 254. Data copy information 254 may be stored as a file or in a database of some sort, such as a relational database.

A data copy 250 identifier is the information that may be used to identify particular excerpts of the content of database 242 (e.g., a particular Web page) that was provided to a Web service client. Data copy 250 identifier may be or may include any information that may be used to uniquely identify excerpts of content from database 242. This information may be a database index, a title, a title with chapter/page number/paragraph number, a title with starting and ending line numbers, a descriptive string, a Web page identifier, or any other data, including metadata, that may be used to identify particular content and/or particular excerpts of content of database 242, or a combination of two or more such data items. Note that this information identifies the excerpted content, but may not distinguish between different copies of the excerpted content provided to different Web service clients.

A permutation identifier may be or may include the information that may be used to identify a particular permutation of synonym substitutions that was made in a data copy. In one embodiment, the permutation identifier may be the unique permutation of synonyms. In another embodiment, a hash of the modified excerpt or of the word positions into which synonyms were substituted may be generated and stored as the permutation identifier. In yet another embodiment, the permutation identifier may be or may include a unique set of data that was used to generate the permutation, such as word positions in an excerpt and assigned numbers of the particular synonyms that were substituted for those words. For example, if the permutation is generated by permuting a set of synonyms in textual content, the permutation identifier may be a "permutation code" for this particular permutation. As an example, assume there are M word positions in a data copy (e.g., an excerpt from a textual work) into each of which one of N different synonyms may be inserted by the synonym substitution mechanism 208 to generate a unique permutation. Assume that M is 8 for a particular excerpt. An exemplary permutation code for a particular permutation of this excerpt may be "51382243," with each digit representing which of the N synonyms for that word position was used in this permutation. Note that other mechanisms than those described above may be used to store permutation information.

In one embodiment, synonym substitution mechanism 208 or some other mechanism may access the stored permutation information and apply the permutation identifier from data copy information 254 to regenerate the permutation of the particular data copy 250 when searching for instances of the data copy 250 including the particular permutation of synonym substitutions on the Web.

Note that data copy information 254 may be accessed by synonym substitution mechanism 208 to determine which particular permutations of synonyms have been used for particular data copies 250 (e.g., for a particular excerpt from a textual work), and to thus assure that a unique permutation is used in a newly-requested data copy 250. Also note that stale or expired entries in data copy information 254 may be periodically removed so that permutations that are no longer in use may be reused.

FIG. 4 illustrates a portion of an exemplary synonym database 256 according to one embodiment, and is not intended to be limiting. In one embodiment, synonym substitution mechanism 208 may select synonyms for selected words in an excerpt from synonym database 256. For each key word in synonym database 256, the database may include one or more alternative synonyms. In one embodiment, the synonym substitution mechanism 208 may select a synonym for a word from among two or more candidate synonyms according to a random selection algorithm. Alternatively, some other algorithm may be used to select a synonym from among two or more candidate synonyms. In one embodiment, data copy information 254 may be accessed by synonym substitution mechanism 208 to determine which particular permutations of synonyms have been used for particular data copies 250 to insure that a unique permutation of synonyms are selected for a new data copy 250.

The synonyms for words in synonym database 256 may be at least partially determined, selected, and/or edited by humans to insure that the synonyms for a word are close matches in meaning and not ambiguous, potentially awkward or offensive, or otherwise inappropriate or potentially problematic. In one embodiment, synonym database 256 may be adapted from publicly or commercially available sources for synonyms, such as a thesaurus or lexicon. It may not be necessary to include synonyms for most or all words in synonym database 256. Instead, a selected subset of words or a subset of a subset of words (e.g., a subset of nouns) may be included, with selected synonyms, in database 256. For example, words that are common and that have one or more very close and unambiguous synonyms may be selected for and included in database 256, while uncommon words and/or words without close or unambiguous synonyms may be excluded. In addition, a set of synonyms for a particular word may be pruned to remove potentially problematic synonyms.

Also note that synonym database 256 may be modified to exclude or add words with their associated synonyms, and/or to add or remove synonyms for particular words. For example, if it comes to the attention of the Web service provider that a particular synonym substituted for a particular word in some context produces ambiguity or potentially inappropriate interpretations of the text, the synonym or word may be removed or otherwise marked to prevent the synonym from being substituted for the word. Similarly, better synonyms may emerge or be determined over time and added to synonym database 256 for particular words.

It is important to note that different sets of words for which synonyms may be substituted and/or different synonyms for particular words may be appropriate for different types of textual data. For example, different words and/or different synonyms may be appropriate for movie reviews than those that are appropriate for works of fiction. Thus, in one embodiment, different databases 256 that are appropriate for particular applications may be used with synonym substitution mechanism 208, or alternatively a database 256 may include indications as to which words/synonyms are appropriate for particular types of textual works.

In some embodiments, database 256 may include other content than word synonyms. For example, database 256 may include word combination synonyms (i.e., synonyms for combinations of two or more words, such as "viewable by" and "appropriate for" as related to movies) or phrase synonyms. Alternatively, database 256 may include alternative spellings or alternative misspellings for selected words.

FIGS. 5A through 5C illustrate a simple "excerpt" and synonym substitution in the excerpt according to one embodiment. FIG. 5A illustrates a sample sentence as an "excerpt", permutations of which may be programmatically generated by the synonym substitution mechanism 208 and distributed to Web service client applications and that may be linked to particular Web service client applications according to one embodiment. In FIG. 5B, synonym substitution mechanism 208 has used the synonym database 256 of FIG. 4 to generate a permutation of the excerpt using synonym substitution. FIG. 5C illustrates a different permutation of the excerpt using synonym database 256 of FIG. 4 to perform synonym substitution.

FIGS. 6A through 6D illustrate two adjacent and overlapping excerpts and synonym substitution in the excerpts that may help prevent excerpt chaining according to one embodiment. Note that Wn in FIGS. 6A-6D represents "word number," while WnSn represents "word number, synonym number." FIGS. 6A and 6B illustrate two adjacent and overlapping excerpts from a textual work prior to synonym substitution. Note that the last sentence of the excerpt in FIG. 6A appears as the first sentence of the excerpt in FIG. 6B. FIGS. 6C and 6D illustrate the two adjacent and overlapping excerpts from the textual work after synonym substitution. In the excerpt illustrated in FIG. 6C, W28S1 (i.e., the first synonym for word 28) has been substituted for W28, while W31 has been replaced with W31S3. In the excerpt illustrated in FIG. 6D, W28S2 (i.e., the second synonym for word 28) has been substituted for W28, while W31 has been replaced with W31S1. The replacement of words in overlapping portions of adjacent excerpts with different synonyms makes the task of programmatically chaining excerpts difficult, as a computer program cannot simply compare overlapping portions to identify links between adjacent excerpts. Note that, as an alternative to or in conjunction with replacing the same words in overlapping portions of adjacent excerpts with different synonyms, different words in overlapping portions of adjacent excerpts may be replaced with synonyms. For example, the overlapping portions of the two adjacent excerpts may be modified by the synonym substitution mechanism to read:

W26 W27 W28S1 W29 W30 W31S3.
W26S4 W27 W28 W29 W30S2 W31.

or:

W26 W27 W28S1 W29 W30 W31S3.
W26S4 W27 W28 W29 W30 W31S1.

Figure 7:
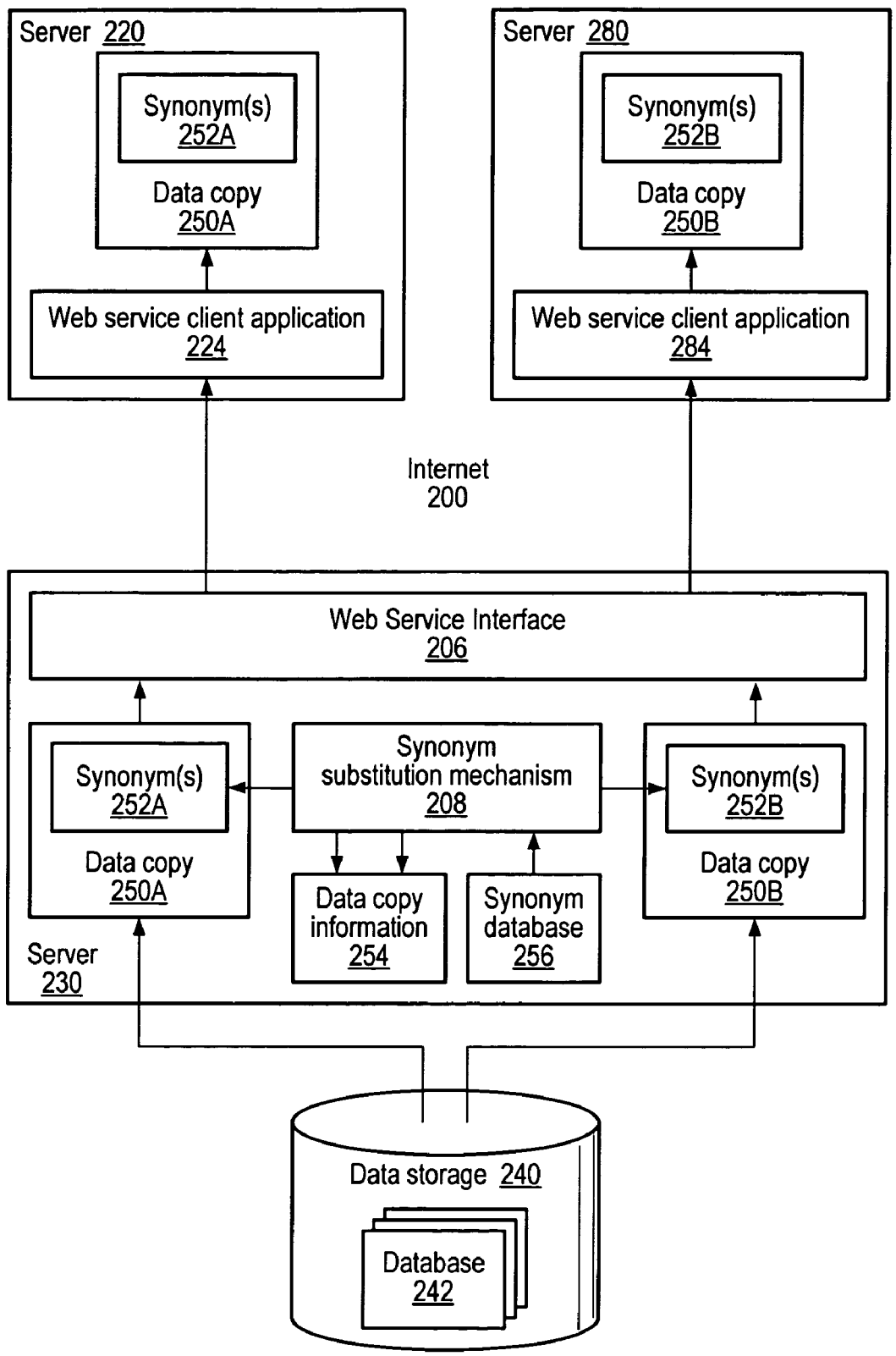
FIG. 7 illustrates a Web service provider providing data copies of the same content, each including permutations of synonym substitutions, to different Web service client applications according to one embodiment.

FIG. 7 illustrates a Web service provider providing data copies of the same content, each including permutations of synonym substitutions, to different Web service client applications according to one embodiment. To access and copy particular content provided by the Web service provider, each Web service client application, applications 224 and 284 in this example, may send a request message to Web service interface 206 via Internet 200. Note that, while FIG. 7 illustrates the two requests being processed essentially in parallel, the requests may be received at different times and processed separately and serially. The Web service may process each request by accessing the indicated data in database 242. A different copy of the requested data, data copies 250A and 250B, may be generated in response to each request. Synonym substitution mechanism 208 may substitute a permutation of synonyms 252A in data copy 250A and a different permutation of synonyms 252B in data copy 250B. Synonym substitution mechanism 208 may store information that associates each data copy 250 with the particular Web service client application that receives the data copy 250 in data copy information 254. This information may later be used to locate instances of the data copies 250A and 250B and to link particular instances of the data copies 250A and 250B to the particular Web service client application that received the data copy 250. Web service interface 206 may return the data copies 250 with their particular permutations of synonyms 252 to the Web service client applications in response messages via Internet 200.

Figure 8:
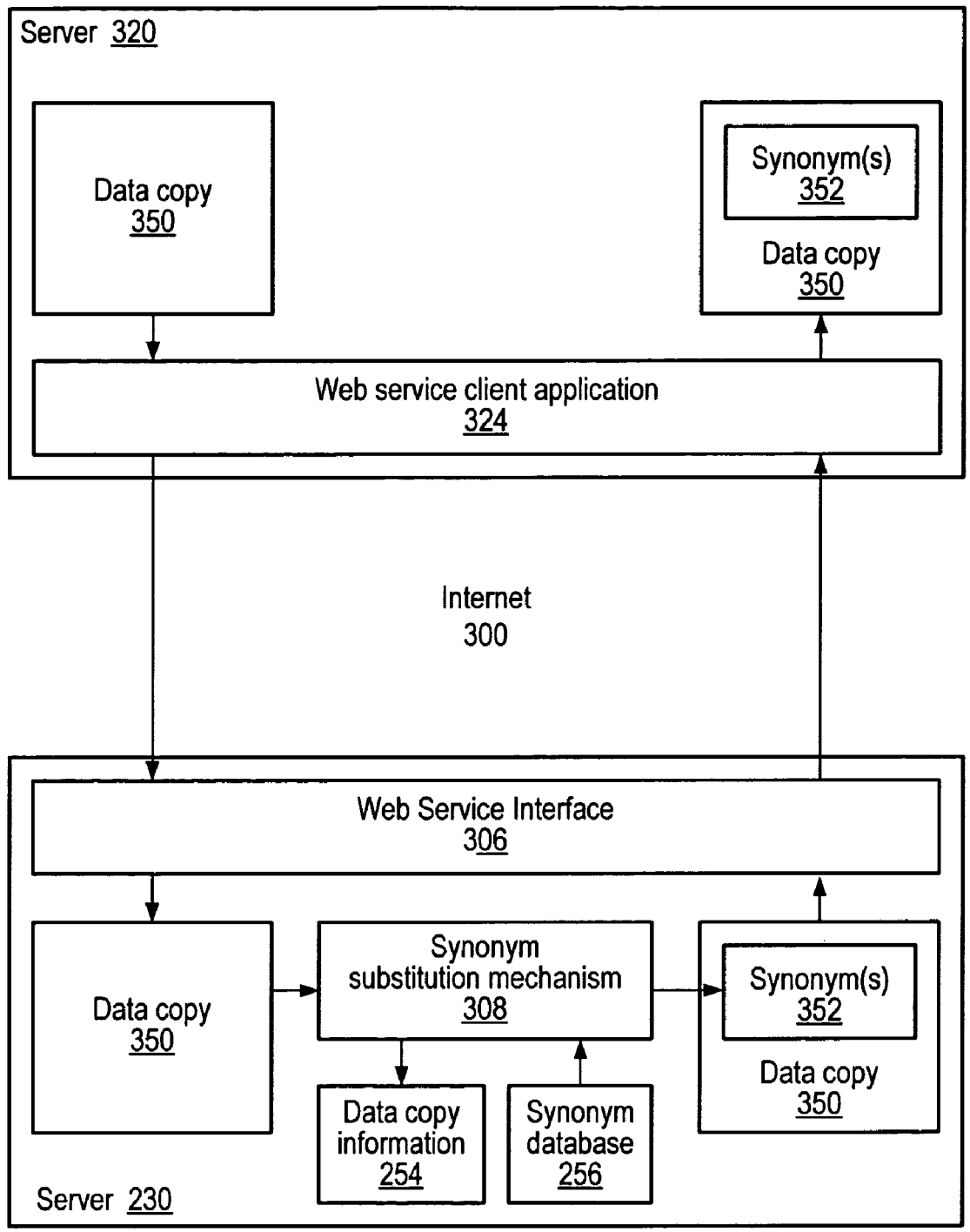
FIG. 8 illustrates an example of a synonym substitution mechanism implemented as a Web service with a Web service interface according to one embodiment.

FIG. 8 illustrates an example of a synonym substitution mechanism implemented as a Web service with a Web service interface according to one embodiment. In this embodiment, synonym substitution mechanism 308 may be a Web service with a Web service interface 306 that allows Web service clients such as Web service client application 324 to access the synonym substitution mechanism 308 through the Web service interface 206 to substitute synonyms 352 into data copies 350 provided by the Web service client, for example data copies of content extracted from third-party works or collections. In one embodiment, Web service client application 324 may access the synonym substitution mechanism 308 to search for and detect illicit or unauthorized instances of the data copies 350 with substituted synonyms 352 on the Web.

In this example, Web service client application 324 may send data copy 350 to Web service interface 306 in one or more messages. Web service client application 324 may also send information identifying a client of the Web service client application 324 that is to receive the particular data copy 350. Synonym substitution mechanism 308 may then substitute synonyms 352 for selected words in data copy 350, and store information on the permutation of the data copy 350 in data copy information 354, which may include information on the client that is to receive the data copy 350. Web service interface 306 may then return data copy 350 with substituted synonyms 352 to Web service client application 324. Alternatively, Web service interface 306 may instead forward data copy 350 with substituted synonyms 352 to the client of server 320 for which the data copy 350 is intended. In one embodiment, synonym substitution mechanism 308 may be programmed to periodically or aperiodically search the Web for (legitimate and illegitimate) instances of data copy 350, and to report the results of the search back to Web service client application 324 via Web service interface 306. Alternatively, Web service client application 324 may periodically or aperiodically request that a search for (legitimate and illegitimate) instances of data copy 350 be performed via Web service interface 306.

Note that, while FIG. 8 illustrates an exemplary synonym substitution mechanism implemented as a Web service that provides a Web service interface to the functions of the synonym substitution mechanism for clients of the Web service, embodiments of the synonym substitution mechanism may be implemented according to other architectures than a Web services architecture, for example as a server-hosted application accessible by clients according to a client/server architecture, as a service offered by one or more peer nodes in a peer-to-peer networking environment, or in general as one or more modules, services, and/or applications on a system accessible via an API to other modules, services or applications on the same system and/or on other systems coupled to the system via a network interface or some other communications interface.

Figure 9:
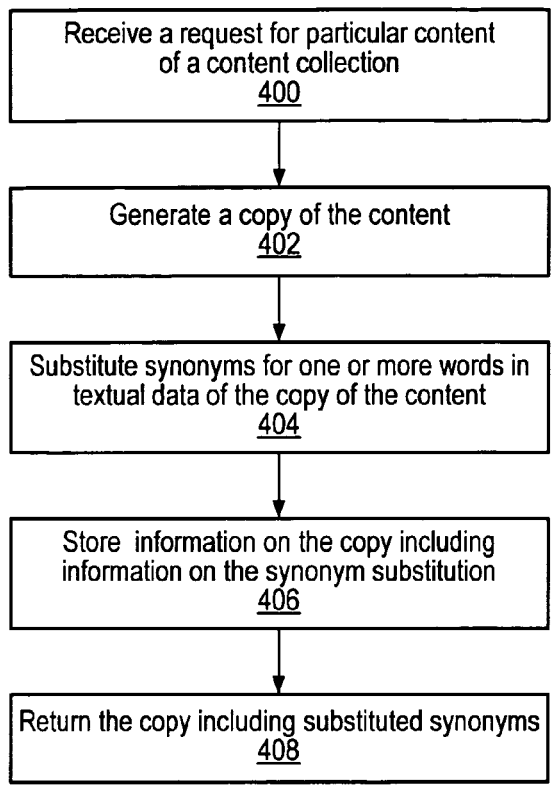
FIG. 9 is a flowchart illustrating a method of substituting synonyms in textual data in copies of content to be returned to requesting clients according to one embodiment.

FIG. 9 is a flowchart illustrating a method of substituting synonyms in textual data in copies of content to be returned to requesting clients according to one embodiment. As indicated at 400, a request may be received for particular content of a content collection from a Web service client application, typically under an agreement that may specify how the data may be used and if the data copy may or may not be redistributed, and if so under what terms and conditions. The requested content may, for example, be or include an excerpt from a copyrighted work such as a book. As indicated at 402, a copy of the requested content (e.g., of the appropriate excerpt that satisfies the request) may be generated. As indicated at 404, the synonym substitution mechanism may substitute synonyms for one or more words in the textual data in the copy. In one embodiment, synonyms for words may be selected from a synonym database that includes key words and one or more candidate synonyms for each key word. In one embodiment, the synonym substitution may be performed according to a technique that allows the particular copy to include a particular permutation of synonym substitutions. Information on the particular copy and the particular permutation used in the copy may be recorded, and may be used to link the particular copy to the client that receives the copy. Information on the particular permutation used in a particular copy may be used, for example to link located instances of the copy including the permutation to the client that initially receives the copy. As indicated at 408, the copy including the substituted synonyms to the requestor.

Figure 10:
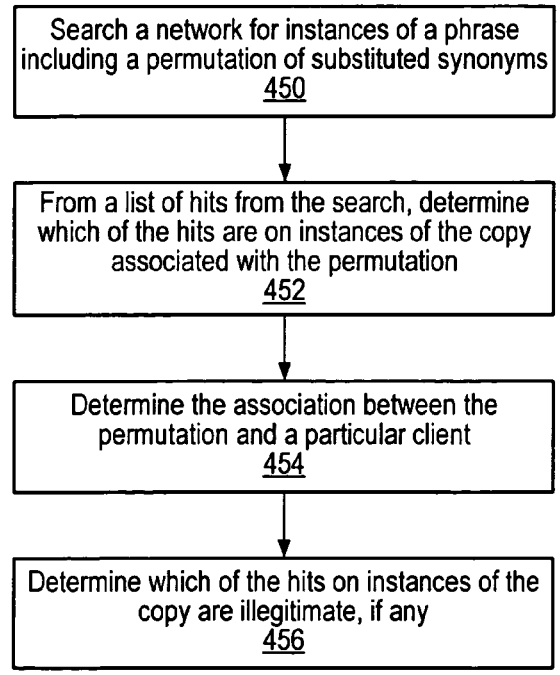
FIG. 10 is a flowchart illustrating a method for detecting copies of content on a network that include particular permutations of synonyms, and for linking those detected copies to particular clients, according to one embodiment.

FIG. 10 is a flowchart illustrating a method for detecting copies of content on a network that include particular permutations of synonyms, and for linking those detected copies to particular clients, according to one embodiment. As indicated at 450, a mechanism may be used to search a network for "hits" on instances of a search term or phrase, e.g. from a copyrighted work, that includes a particular permutation of synonym substitutions. From a list of hits generated by the search, the mechanism may determine which of the hits are actually on instances of the associated copy, as indicated at 452. The mechanism may use stored information on the copy, which may include information on the particular permutation and information identifying a client that originally received the copy, and possibly other data to determine the association between the copy and a particular client, as indicated at 454. As indicated at 456, the hits on the instances of the copy associated with the permutation of synonym substitutions may be further examined to determine which, if any, of the hits on instances of the copy are illegitimate. This information may then be used to enforce terms of an agreement between the content provider and the client and/or to pursue copyright violations, if desired.

Figure 11:
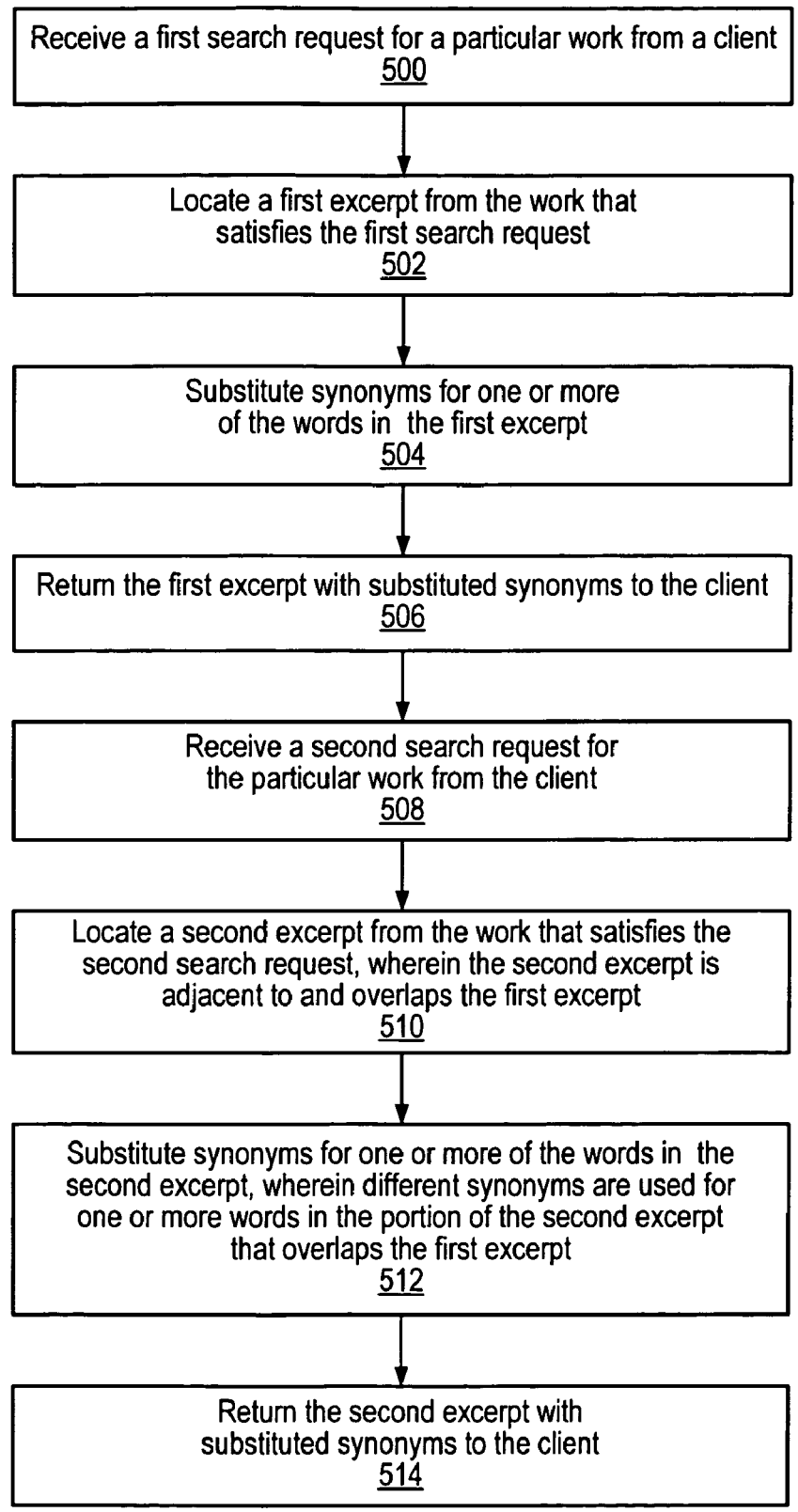
FIG. 11 is a flowchart illustrating a method for synonym substitution in adjacent and overlapping excerpts from a work according to one embodiment.

FIG. 11 is a flowchart illustrating a method for synonym substitution in adjacent and overlapping excerpts from a work according to one embodiment. As indicated at 500, a first search request for a particular work may be received from a client. As indicated at 502, a first excerpt from the work that satisfies the first search request may be located and a copy of the excerpt may be generated. As indicated at 504, the synonym substitution mechanism may substitute synonyms for one or more of the words in the copy of the first excerpt. The copy of the first excerpt may then be returned to the requesting client, as indicated at 506.

As indicated at 508, a second search request for the particular work may be received from the client. As indicated at 510, a second excerpt from the work that satisfies the second search request may be located and a copy of the second excerpt may be generated. The second excerpt may be adjacent to and may overlap the first excerpt. As indicated at 512, the synonym substitution mechanism may substitute synonyms for one or more of the words in the copy of the second excerpt. However, different synonyms may be substituted for one or more words in a portion of the second excerpt that overlaps the first excerpt than were used in the overlapping portion of the first excerpt. Alternatively, synonyms may be substituted for one or more different words in the overlapping portion of the second excerpt. The replacement of words in overlapping portions of adjacent excerpts with different synonyms makes the task of programmatically chaining excerpts difficult, as a computer program cannot simply compare overlapping portions to directly identify links between adjacent excerpts. The copy of the second excerpt may then be returned to the requesting client, as indicated at 506.

Illustrative System

Figure 12:
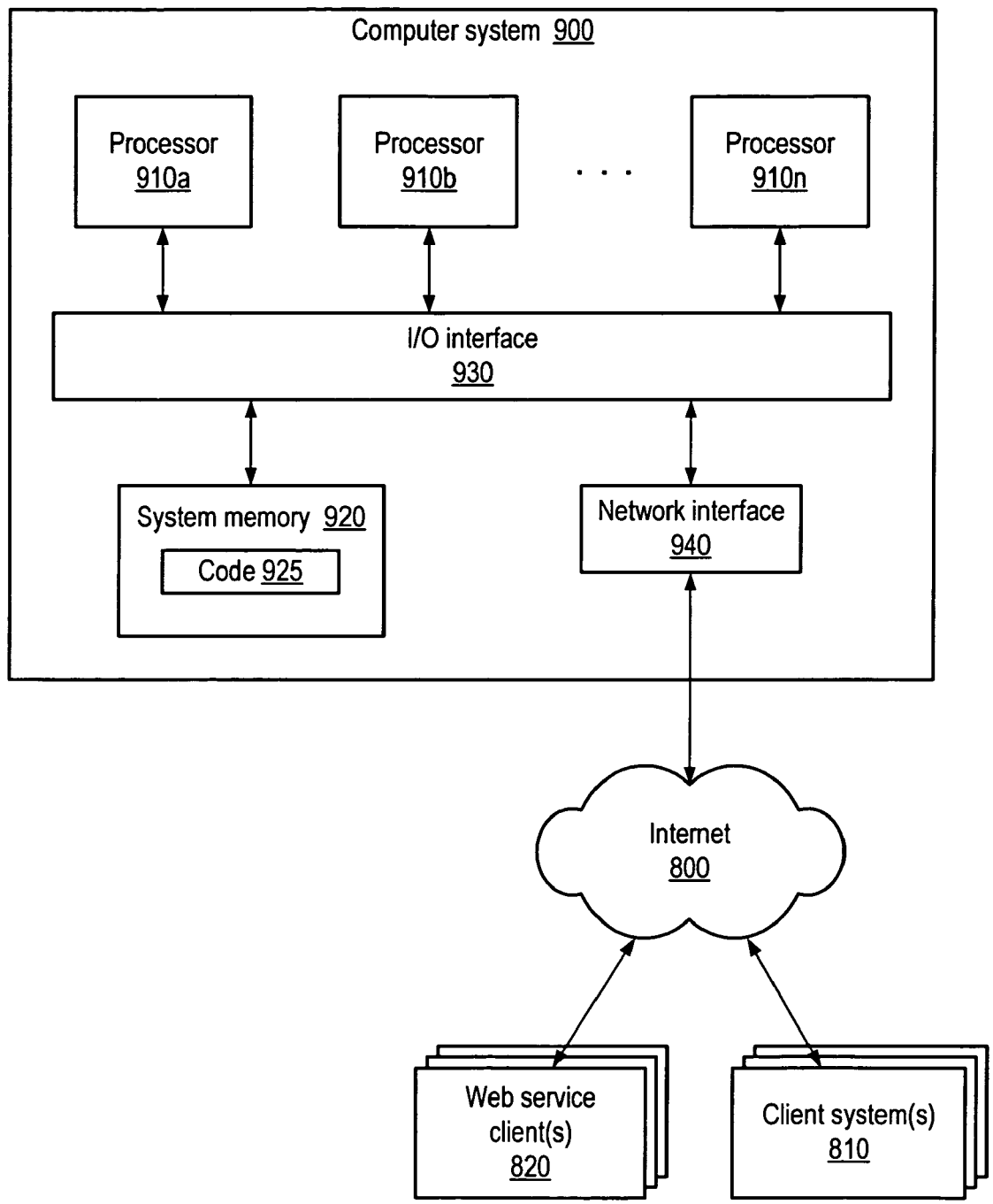
FIG. 12 is a block diagram illustrating an exemplary embodiment of a computer system.

In one embodiment, a Web server that implements one or more components of a synonym substitution mechanism as described herein may include a general-purpose computer system that includes or is configured to access one or more computer-accessible media, such as computer system 900 illustrated in FIG. 12. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a synonym substitution mechanism, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In particular, network interface 940 may be configured to allow communication between computer system 900 and other computer systems hosting Web services and Web service clients on the Internet. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 2 through 11 for implementing a synonym substitution mechanism for substituting synonyms into copies of data that are provided to Web service clients 820 and for searching for illegitimate data copies including the synonym substitutions. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  a processor; and
  a memory comprising program instructions, wherein the program instructions are executable by the processor to:
    receive a request for particular content;
    extract a copy of the requested particular content from a content collection, wherein the particular content includes textual data;
    substitute a synonym for each of one or more selected words in the textual data of the copy, wherein to substitute a synonym for each of one or more selected words, the program instructions are further executable by the processor to:

access a synonym database comprising a plurality of key words, wherein each key word is associated with one or more synonyms in the synonym database; and select a particular synonym to substitute for a particular selected word in the textual data of the copy from one or more synonyms associated with a key word in the database that matches the particular selected word in the textual data of the copy; and return the copy with the substituted synonyms in response to the request.

2. The system as recited in claim 1, wherein said request is received from a Web service client via a Web service interface.

3. The system as recited in claim 1, wherein the textual data of the requested particular content comprises an excerpt from a work stored in the content collection.

4. The system as recited in claim 3, wherein the program instructions are further executable by the processor to:

receive a second request for a second excerpt from the work stored in the content collection;

extract a second copy including textual data from the content collection, wherein the textual data of the second copy comprises the second excerpt from the work stored in the content collection;

substitute a synonym for each of one or more selected words in the second excerpt in the second copy; and return the second copy with the substituted synonyms in response to the second request.

5. A system, comprising:

a processor; and a memory comprising program instructions wherein the program instructions are executable by the processor to:

receive a request for particular content;

extract a copy of the requested particular content from a content collection, wherein the particular content includes textual data, and wherein the textual data of the requested particular content comprises an excerpt from a work stored in the content collection;

substitute a synonym for each of one or more selected words in the textual data of the copy;

return the copy with the substituted synonyms in response to the request;

receive a second request for a second excerpt from the work stored in the content collection;

extract a second copy including textual data from the content collection, wherein the textual data of the second copy comprises the second excerpt from the work stored in the content collection, wherein the second excerpt is adjacent to and overlaps the excerpt in the copy returned in response to the request;

substitute one or more different synonyms for one or more selected words in a portion of the second excerpt in the second copy that overlaps the excerpt in the copy returned in response to the request than the synonyms that were substituted for the same one or more selected words in a portion of the excerpt in the copy returned in response to the request that overlaps the second excerpt; and return the second copy with the substituted synonyms in response to the second request.

6. The system as recited in claim 5, wherein the program instructions are further executable by the processor to access a synonym database comprising a plurality of key words, wherein each key word is associated with one or more synonyms in the synonym database, and wherein the program instructions are further executable by the processor to select a particular synonym to substitute for a particular selected word in the textual data of the copy from one or more synonyms associated with a key word in the database that matches the particular selected word in the textual data of the copy.

7. A system, comprising:

a processor; and a memory comprising program instructions, wherein the program instructions are executable by the processor to:

receive a request for particular content;

extract a copy of the requested particular content from a content collection, wherein the particular content includes textual data;

substitute a synonym for each of one or more selected words in the textual data of the copy, wherein the synonyms substituted for each of one or more selected words in the textual data of the copy form a particular permutation of possible synonym substitutions in the textual data of the copy that is unique to the copy of the requested particular content; and return the copy with the substituted synonyms in response to the request.

8. The system as recited in claim 7, wherein the copy of the requested particular content is returned to a client in accordance with an agreement that allows the client to cache the copy for a period after which the copy is expired.

9. The system as recited in claim 8, wherein the program instructions are further executable by the processor to detect expired caches of the copy of the requested particular content returned to the client according to the particular permutation of possible synonym substitutions that is unique to the copy of the requested particular content.

10. The system as recited in claim 7, wherein the program instructions are further executable by the processor to locate unauthorized caches of the copy of the requested particular content according to the particular permutation of possible synonym substitutions that is unique to the copy of the requested particular content.

11. The system as recited in claim 10, wherein the program instructions are further executable by the processor to associate located unauthorized caches of the copy of the requested particular content with the client according to information uniquely identifying the client to which the copy of the requested particular content was returned.

12. The system as recited in claim 7, wherein the program instructions are further executable by the processor to store information on the particular permutation of possible synonym substitutions that is unique to the copy of the requested particular content along with information uniquely identifying the client to which the copy of the requested particular content was returned.

13. The system as recited in claim 12, wherein the program instructions are further executable by the processor to store a timestamp for the copy of the requested particular content along with the stored information on the particular permutation of possible synonym substitutions that is unique to the copy of the requested particular content and the information uniquely identifying the client to which the copy of the requested particular content was returned.

14. The system as recited in claim 13, wherein the copy of the requested particular content returned to the client is provided to the client in accordance with an agreement that allows the client to cache the copy of the requested particular content for a period after which the copy is expired, and wherein the program instructions are further executable by the processor to detect expired caches of the copy of the requested particular content according to the stored timestamp, information on the particular permutation of possible synonym substitutions that is unique to the copy of the requested particular content, and the information uniquely identifying the client to which the data copy was returned.

15. A method, comprising:
performing on a computer:
receiving a request for particular content;
extracting a copy of the requested particular content from a content collection, wherein the particular content includes textual data, wherein the textual data of the requested particular content comprises an excerpt from a work stored in the content collection;
substituting a synonym for each of one or more selected words in the textual data of the copy;
returning the copy with the substituted synonyms in response to the request;
receiving a second request for a second excerpt from the work stored in the content collection;
extracting a second copy including textual data from the content collection, wherein the textual data of the second copy comprises the second excerpt from the work stored in the content collection, wherein the second excerpt is adjacent to and overlaps the excerpt in the copy returned in response to the request;
substituting one or more different synonyms for one or more selected words in a portion of the second excerpt in the second copy that overlaps the excerpt in the copy returned in response to the request than the synonyms that were substituted for the same one or more selected words in a portion of the excerpt in the copy returned in response to the request that overlaps the second excerpt; and
returning the second copy with the substituted synonyms in response to the second request.

16. The method as recited in claim 15, wherein said substituting a synonym for each of one or more selected words in the textual data of the copy comprises selecting synonyms for the one or more selected words from a synonym database comprising a plurality of key words, wherein each key word is associated with one or more synonyms in the synonym database.

17. The method as recited in claim 15, wherein said request is received from a Web service client via a Web service interface.

18. A method, comprising:
performing on a computer:
receiving a request for particular content;
extracting a copy of the requested particular content from a content collection, wherein the particular content includes textual data;
substituting a synonym for each of one or more selected words in the textual data of the copy, wherein said substituting a synonym for each of one or more selected words in the textual data of the copy comprises selecting synonyms for the one or more selected words from a synonym database comprising a plurality of key words, wherein each key word is associated with one or more synonyms in the synonym database, and wherein said selecting synonyms for the one or more selected words from a synonym database comprises selecting a particular synonym to substitute for a particular selected word in the textual data of the copy from one or more synonyms associated with a key word in the database that matches the particular selected word in the textual data of the copy; and
returning the copy with the substituted synonyms in response to the request.

19. A method, comprising:
performing on a computer:
receiving a request for particular content;
extracting a copy of the requested particular content from a content collection, wherein the particular content includes textual data;
substituting a synonym for each of one or more selected words in the textual data of the copy, wherein the synonyms substituted for each of one or more selected words in the textual data of the copy form a particular permutation of possible synonym substitutions in the textual data of the copy that is unique to the copy of the requested particular content; and
returning the copy with the substituted synonyms in response to the request.

20. The method as recited in claim 19, wherein the textual data of the requested particular content comprises an excerpt from a copyrighted work stored in the content collection.

21. The method as recited in claim 20, further comprising:
receiving a second request for a second excerpt from the work stored in the content collection;
extracting a second copy including textual data from the content collection, wherein the textual data of the second copy comprises the second excerpt from the work stored in the content collection;
substituting a synonym for each of one or more selected words in the second excerpt in the second copy; and
returning the second copy with the substituted synonyms in response to the second request.

22. The method as recited in claim 21, wherein the second excerpt is adjacent to and overlaps the excerpt in the copy returned in response to the request, and wherein the method further comprises substituting one or more different synonyms for one or more selected words in a portion of the second excerpt in the second copy that overlaps the excerpt in the copy returned in response to the request than the synonyms that were substituted for the same one or more selected words in a portion of the excerpt in the copy returned in response to the request that overlaps the second excerpt.

23. The method as recited in claim 19, wherein the copy of the requested particular content is returned to a client in accordance with an agreement that allows the client to cache the copy for a period after which the copy is expired.

24. The method as recited in claim 23, further comprising detecting expired caches of the copy of the requested particular content returned to the client according to the particular permutation of possible synonym substitutions that is unique to the copy of the requested particular content.

25. The method as recited in claim 19, further comprising locating unauthorized caches of the copy of the requested particular content according to the particular permutation of possible synonym substitutions that is unique to the copy of the requested particular content.

26. The method as recited in claim 25, further comprising associating located unauthorized caches of the copy of the requested particular content with the client according to information uniquely identifying the client to which the copy of the requested particular content was returned.

27. The method as recited in claim 19, further comprising storing information on the particular permutation of possible synonym substitutions that is unique to the copy of the requested particular content along with information uniquely identifying the client to which the copy of the requested particular content was returned.

28. The method as recited in claim 27, further comprising storing a timestamp for the copy of the requested particular content along with the stored information on the particular permutation of possible synonym substitutions that is unique to the copy of the requested particular content and the information uniquely identifying the client to which the copy of the requested particular content was returned.

29. The method as recited in claim 28, wherein the copy of the requested particular content returned to the client is provided to the client in accordance with an agreement that allows the client to cache the copy of the requested particular content for a period after which the copy is expired, and wherein the method further comprises detecting expired caches of the copy of the requested particular content according to the stored timestamp, information on the particular permutation of possible synonym substitutions that is unique to the copy of the requested particular content, and the information uniquely identifying the client to which the data copy was returned.

30. A computer-accessible storage medium storing program instructions that when executed by a computer perform:
   identifying particular content;
   extracting a copy of the particular content from a content collection wherein the particular content includes textual data;
   substituting a synonym for each of one or more selected words in the textual data of the copy, wherein, in said substituting a synonym for each of one or more selected words in the textual data of the copy, the program instructions are further configured to implement selecting synonyms for the one or more selected words from a synonym database comprising a plurality of key words, wherein each key word is associated with one or more synonyms in the synonym database, and wherein, in said selecting synonyms for the one or more selected words from a synonym database, the program instructions are further configured to implement selecting a particular synonym to substitute for a particular selected word in the textual data of the copy from one or more synonyms associated with a key word in the database that corresponds to the particular selected word in the textual data of the copy; and
   providing the copy with the substituted synonyms.

31. The computer-accessible storage medium as recited in claim 30, wherein the synonyms substituted for each of one or more selected words in the textual data of the copy form a particular permutation of possible synonym substitutions in the textual data of the copy that is unique to the copy of the particular content.

32. A computer-accessible storage medium storing program instructions that when executed by a computer perform:
   identifying particular content;
   extracting a copy of the particular content from a content collection, wherein the particular content includes textual data, wherein the textual data of the particular content comprises an excerpt from a work stored in the content collection;
   substituting a synonym for each of one or more selected words in the textual data of the copy;
   providing the copy with the substituted synonyms;
   identifying a second excerpt from the work stored in the content collection;
   extracting a second copy including textual data from the content collection, wherein the textual data of the second copy comprises the second excerpt from the work stored in the content collection, wherein the second excerpt is adjacent to and overlaps the excerpt in the copy of the particular content;
   substituting one or more different synonyms for one or more selected words in a portion of the second excerpt in the second copy that overlaps the excerpt in the copy of the particular content than the synonyms that were substituted for the same one or more selected words in a portion of the excerpt in the copy of the particular content that overlaps the second excerpt; and
   providing the second copy with the substituted synonyms.

33. A computer-accessible storage medium storing program instructions that when executed by a computer perform:
   identifying particular content;
   extracting a copy of the particular content from a content collection, wherein the particular content includes textual data;
   substituting a synonym for each of one or more selected words in the textual data of the copy, wherein the synonyms substituted for each of one or more selected words in the textual data of the copy form a particular permutation of possible synonym substitutions in the textual data of the copy that is unique to the copy of the particular content; and
   providing the copy with the substituted synonyms.

34. The computer-accessible storage medium as recited in claim 33, wherein, in said substituting a synonym for each of one or more selected words in the textual data of the copy, the program instructions are further configured to implement selecting synonyms for the one or more selected words from a synonym database comprising a plurality of key words, wherein each key word is associated with one or more synonyms in the synonym database.

35. The computer-accessible storage medium as recited in claim 33, wherein the textual data of the particular content comprises an excerpt from a copyrighted work stored in the content collection.

36. The computer-accessible storage medium as recited in claim 35, wherein the program instructions are further configured to implement:
   identifying a second excerpt from the work stored in the content collection;
   extracting a second copy including textual data from the content collection, wherein the textual data of the second copy comprises the second excerpt from the work stored in the content collection;
   substituting a synonym for each of one or more selected words in the second excerpt in the second copy; and
   providing the second copy with the substituted synonyms.

37. The computer-accessible storage medium as recited in claim 36, wherein the second excerpt is adjacent to and overlaps the excerpt in the copy of the particular content.

38. The computer-accessible storage medium as recited in claim 33, wherein the copy of the particular content is returned to a client in accordance with an agreement.

39. The computer-accessible storage medium as recited in claim 38, wherein the agreement allows the client to cache the copy for a period after which the copy is expired.

40. The computer-accessible storage medium as recited in claim 39, wherein the program instructions are further configured to implement detecting expired caches of the copy of the particular content returned to the client according to the particular permutation of possible synonym substitutions that is unique to the copy of the particular content.

41. The computer-accessible storage medium as recited in claim 33, wherein the program instructions are further configured to implement locating unauthorized caches of the copy of the particular content according to the particular permutation of possible synonym substitutions that is unique to the copy of the particular content.

42. The computer-accessible storage medium as recited in claim 41, wherein the program instructions are further configured to implement associating located unauthorized caches of the copy of the particular content with the client according to information uniquely identifying the client to which the copy of the particular content was returned.

43. The computer-accessible storage medium as recited in claim 33, wherein the program instructions are further configured to implement storing information on the particular permutation of possible synonym substitutions that is unique to the copy of the particular content along with information uniquely identifying a client to which the copy of the particular content was returned.

44. The computer-accessible storage medium as recited in claim 43, wherein the program instructions are further configured to implement storing a timestamp for the copy of the particular content along with the stored information on the particular permutation of possible synonym substitutions that is unique to copy of the particular content and the information uniquely identifying the client to which the copy of the particular content was returned.

45. The computer-accessible storage medium as recited in claim 44, wherein the copy of the particular content returned to the client is provided to the client in accordance with an agreement that allows the client to cache the copy of the particular content for a period after which the copy is expired.

46. The computer-accessible storage medium as recited in claim 45, and wherein the program instructions are further configured to implement detecting expired caches of the copy of the particular content according to the stored timestamp, information on the particular permutation of possible synonym substitutions that is unique to the copy of the particular content, and the information uniquely identifying the client to which the data copy was returned.

* * * * *

UNITED STATES PATENT AND TRADEMARK OFFICE
CERTIFICATE OF CORRECTION

PATENT NO.       : 7,610,382 B1                                          Page 1 of 1
APPLICATION NO. : 11/479825
DATED            : October 27, 2009
INVENTOR(S)      : Hilliard Bruce Siegel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Twelfth Day of October, 2010

David J. Kappos
*Director of the United States Patent and Trademark Office*